(12) United States Patent  (10) Patent No.: US 6,344,947 B1
Kudo                       (45) Date of Patent:     Feb. 5, 2002

(54) HEAD CLEANER

(75) Inventor: Koichi Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/466,921

(22) Filed: Dec. 20, 1999

(30) Foreign Application Priority Data

Dec. 25, 1998 (JP) .......................................... 10-371146

(51) Int. Cl.7 ................................................. G11B 5/41
(52) U.S. Cl. ...................................................... 360/128
(58) Field of Search ................................. 360/128, 137

(56) References Cited

U.S. PATENT DOCUMENTS

| 3,595,584 A | * | 7/1971 | Camras | ........................ 360/55 |
| 5,473,493 A | * | 12/1995 | Kusui | ........................ 360/128 |

FOREIGN PATENT DOCUMENTS

| EP | 102897 | * | 3/1984 |
| JP | 54162533 | * | 12/1979 |
| JP | 2-108214 | | 4/1990 |
| JP | 4-245012 | | 9/1992 |
| JP | 5-174337 | | 7/1993 |
| JP | 5-314435 | | 11/1993 |
| JP | 7-29128 | | 1/1995 |
| JP | 08007237 | * | 1/1996 |
| JP | 8-273128 | | 10/1996 |
| JP | 9-102112 | | 4/1997 |

* cited by examiner

*Primary Examiner*—Hoa T. Nguyen
*Assistant Examiner*—Angel Castro
(74) *Attorney, Agent, or Firm*—McGinn & Gibb, PLLC

(57) ABSTRACT

There is disclosed an object to allow a cleaning member to contact a rotary magnetic head, forcibly scrape off foreign matters, fulfill an original read/write performance or characteristic, and to enhance reliability. A head cleaner is provided with a motor for operating by a power independently of the rotation of a rotary head drum, a cleaning member forcibly driven by the motor to rotate, an arm having one end for supporting the motor and a middle portion rotatably supported on an apparatus base by an arm support pin, a spring having one end connected to the other end side of the arm and the other end fixed to the apparatus base, and a follower roller on the other end of the arm. The follower roller is in a position relation in which when a loading cam wheel rotates and a cam on the side face of the loading cam wheel pushes up the follower roller, the follower roller moves apart from the center of the loading cam wheel.

10 Claims, 3 Drawing Sheets

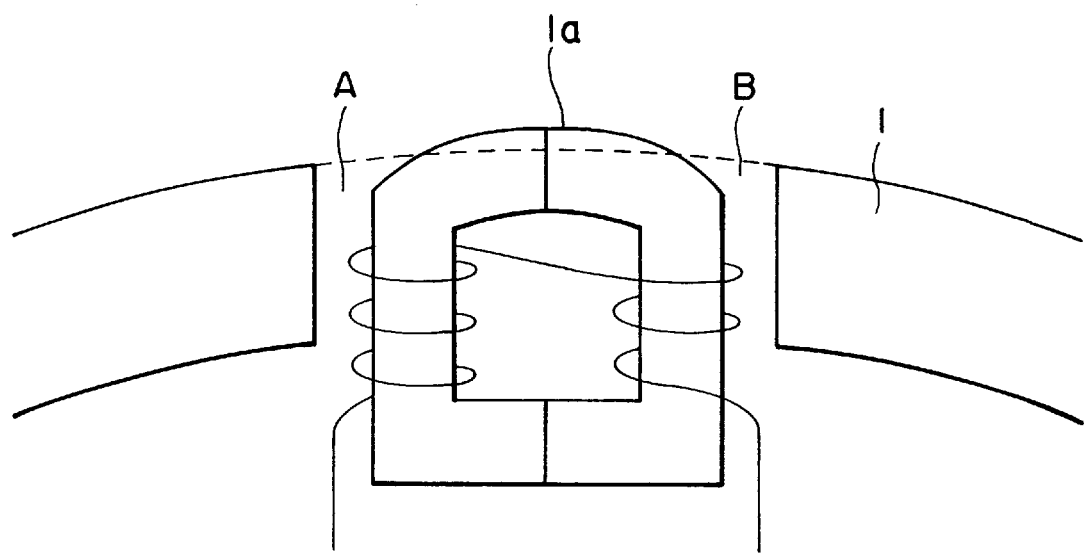
F I G. 4

HEAD CLEANER

BACKGROUND OF THE INVENTION (i) Field of the Invention

The present invention relates to a head cleaner for removing foreign matters sticking to a magnetic head in a magnetic tape read/write apparatus having a rotary head.

(ii) Description of the Related Art

Since the entire surface of a magnetic tape is scanned to perform read/write with an extremely narrow (about 0.06 mm) magnetic head in the magnetic tape read/write apparatus provided with the rotary head, after repeated use, dust and other foreign matters having stuck to the magnetic tape stick to the magnetic head and are accumulated. In this case, since the foreign matters exist between the magnetic tape and the magnetic head, the magnetic tape adheres to the a magnetic head and cannot run, thereby deteriorating the read/write ability, and further frequently resulting in the generation of read errors. Serious problems are thus caused.

For a prior-art head cleaner, for example, in the structure disclosed in Japanese Patent Application Laid-Open No. 102112/1997, as shown in FIG. 3, a cleaning member containing an abrasive in a sponge-like member is used as a cleaning roller 13, the roller is rotatably supported by a roller shaft 15, and an arm 14, to which the roller shaft 15 is fixed, is moved, so that the roller 13 is allowed to abut on a rotary head drum 11, and performs cleaning, and is detached from the drum after the cleaning.

The operation of this prior art will next be described. When the cleaning roller 13, detached from the rotary head drum 11 and not rotating, is allowed to abut on the rotating rotary head drum 11, foreign matters are scraped off as long as there is a difference in peripheral velocity between the outer peripheries of the cleaning roller 13 and rotary head drum 11 immediately after the abutment. However, after the rotation of the cleaning roller 13 is started and the peripheral velocity is close to that of the rotary head drum 11, the cleaning roller 13 and the rotary head drum 11 contact each other just to roll. Since both components fail to rub each other, cleaning effect is disadvantageously eliminated.

As a first prior-art problem, in the system in which the cleaning roller rolls together with the rotary drum, unless the force of the cleaning member constituting the cleaning roller 13 for attracting the foreign matters is stronger than the adhesive force of the foreign matters sticking to the magnetic head and the magnetic head, the foreign matters fail to move to the cleaning member, and no cleaning effect can be expected. When the foreign matters have adhesive properties, they adhere to the head. Therefore, unless the adhesive force of the foreign matters with the cleaning member is stronger than the adhesive force with the magnetic head, the foreign matters cannot be removed even in a long time. A technique for allowing the cleaning member to contain an abrasive or a lubricating oil is also disclosed in the Japanese Patent Application Laid-Open No. 102112/1997, but there is also a problem that when highly adhesive substances adhere to the magnetic head, the substances cannot be removed.

A second problem is that a very small amount of lubricating oil is applied to the surface of the magnetic tape in order to reduce friction with the magnetic head and a tape guide for guiding the tape to the magnetic head or a capstan. Therefore, when the given amount of or more magnetic tapes are treated, the lubricating oil sticking to the rotary head drum moves to and is accumulated on the surface of the cleaning member constituting the cleaning roller 13, and the force of the cleaning member for attracting the foreign matters to itself is gradually weakened, thereby causing a problem that it becomes difficult to remove the foreign matters from the magnetic head.

SUMMARY OF THE INVENTION

The present invention has been developed to find out solution measures in consideration of the above-described prior-art problems.

An object of the present invention is to forcibly scrape off foreign matters by rotating a cleaning member by the drive power of a motor or the like and placing the cleaning member in contact with a magnetic head, fulfill an original read/write performance or characteristic, and to enhance reliability.

According to the present invention, there is provided a head cleaner for contacting/rotating the sliding surface of a rotary head drum for use in a magnetic tape read/write apparatus to perform cleaning, comprising:

a motor for operating by an external power independently of the rotation of the rotary head drum; and a cleaning member for being forcibly driven by the motor to rotate.

The head cleaner of the present invention further comprises rotary cleaning member moving means for pressing or detaching the cleaning member to or from the rotary head drum.

The cleaning member of the head cleaner according to the present invention comprises a rotary brush including a plurality of bristles.

In the head cleaner of the present invention, the rotation shaft direction of the rotary brush is substantially parallel with a tangent line on the side face of the rotary head drum in a point in which the rotary head drum abuts on the rotary brush and the upper surface of the rotary head drum.

The rotary brush has a substantially cylindrical shape, the bristles of the rotary brush are extended in a radial manner on the line connecting the center of the rotary brush and the outside, and the bristles of the rotary brush rub the rotary head drum in parallel with the rotation shaft of the rotary head drum to perform a cleaning operation.

In the head cleaner of the present invention, the rotation shaft direction of the rotary brush substantially agrees with a normal direction in a point in which the rotary head drum abuts on the rotary brush.

The rotary brush has a substantially cylindrical shape, the bristles of the rotary brush are extended in parallel with the normal direction, and the bristles of the rotary brush may rub the rotary head drum to perform the cleaning operation.

The head cleaner of the present invention further comprises an arm having one end for supporting the motor and a middle portion rotatably supported on an apparatus base by an arm support pin, a spring having one end connected to the other end side of the arm, and the other end connected to the apparatus base, and a follower roller on the other end of the arm.

The follower roller is in a position relation in the magnetic tape read/write apparatus in which when a loading cam wheel for rotating with the load/unload operation of a magnetic tape is rotated and a cam on the side face of the loading cam wheel pushes up the follower roller, the follower roller moves apart from the center of the loading cam wheel.

The follower roller of the head cleaner according to the present invention is constituted of a shaft fixed to the other end of the arm, and a roller rotatably supported on the shaft.

The head cleaner of the present invention further comprises a micro switch positioned on the opposite side of the loading cam wheel as seen from the other end of the arm, and positioned to contact the arm only when the follower roller is pushed up by the cam.

When the micro switch contacts the arm, the micro switch turns on and the motor rotates and the rotary head drum slowly rotates, and when the micro switch is detached from the arm, the micro switch turns off and the rotation of the motor stops.

In this constitution, since the rotary cleaning member can rotate itself, the rotary cleaning member scrapes off or rubs off foreign matters, so that the foreign matters can be removed. Therefore, the removing performance is largely enhanced as compared with the prior art which depends only on the adsorptive force of the cleaning member. Moreover, the shaft of the rotary head drum and the rotation shaft of the rotary cleaning member can be set to be parallel with each other, be at right angles to each other, or to form any other arbitrary angle with each other. Therefore, even unless the rotary head drum shaft is driven, rotation is applied to the outer periphery of the rotary head drum by the rotation of the rotary cleaning member so that the foreign matter removing operation can be performed.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 4 is a sectional view showing the position relation of the rotary head drum and a magnetic head.

DESCRIPTION OF THE PREFERRED EMBODIMENTS

Embodiments of the present invention will next be described in detail with reference to the drawings.

Figure 1:
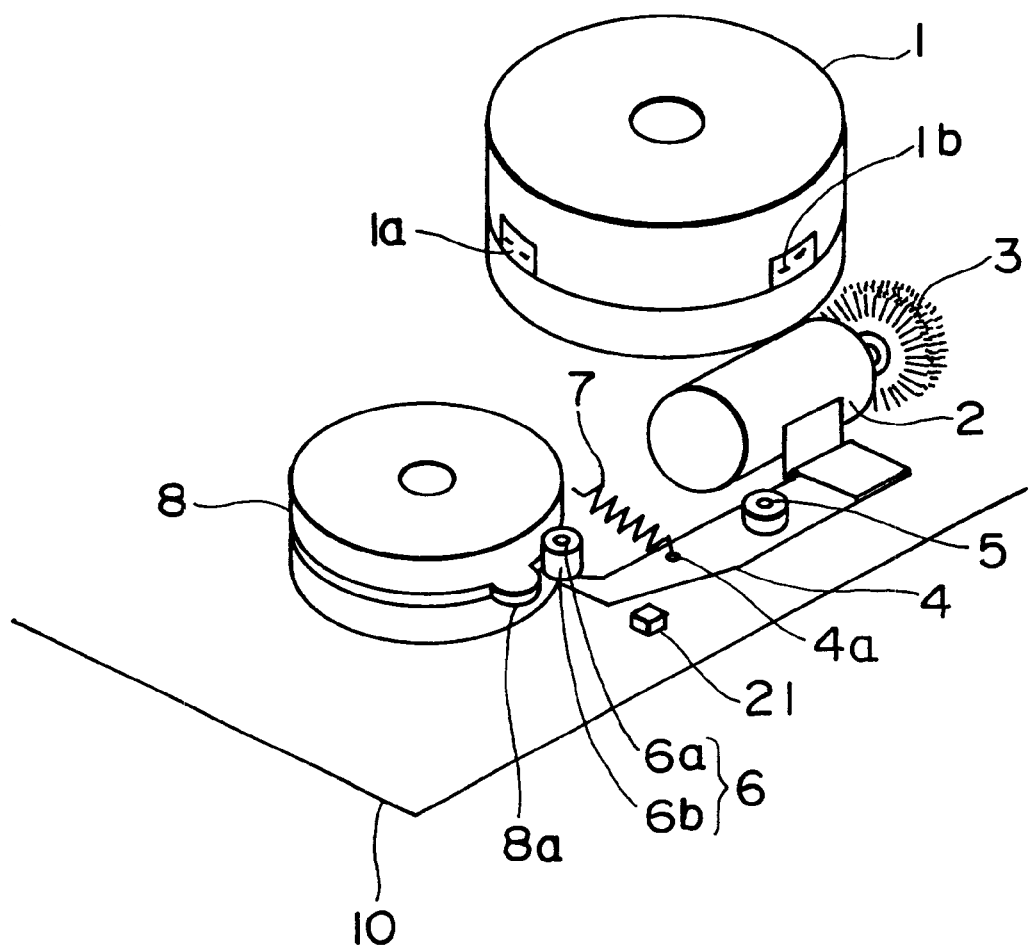
FIG. 1 is a perspective view showing the constitution of a rotary head drum and a head cleaner in a first embodiment of the present invention.

FIG. 1 is a perspective view mainly showing a rotary head drum 1 and a head cleaner in a magnetic tape read/write apparatus having the head cleaner. The rotary head drum 1 has a cylindrical shape, has one to four magnetic heads mounted on its side face, and rotates at a high speed centering on a cylindrical shaft. A loading cam wheel 8 rotates with a load/unload operation when a magnetic tape is loaded and unloaded and comprises a mechanism of taking/discharging a magnetic tape cartridge and a cam for driving a roller guide (not shown) to draw the magnetic tape from the cartridge and wind the magnetic tape around the rotary head drum, but the cam is not shown in FIG. 1 because the cam is not directly related with the present invention.

A rotary brush 3 is attached to the rotation shaft of a motor 2, and the motor 2 is fixed to one end of an arm 4. The arm 4 is rotatably supported in its middle by an arm support pin 5 fixed to an apparatus base 10. A shaft 6a of a follower roller 6 is fixed to the other end of the arm 4. In the follower roller 6 an outer peripheral roller 6b is rotatably supported by the shaft 6a. The side face of the loading cam wheel 8 is provided with a cleaning cam 8a for pushing up the follower roller 6 apart from the center of the loading cam wheel 8. Moreover, while the follower roller 6 is pushed up, the motor 2 rotates, and the rotary head drum 1 is set to rotate at a speed slower than that of usual read/write, for example, at 30 rpm. The rotating speed of the motor 2 is, for example, in the range of 200 to 500 rpm. The cleaning cam 8a may push up the follower roller 6 at any timing, if the magnetic tape is in a not-wound state (the state in which the magnetic tape is wound around a part of the side face of the rotary head drum 1 is hereinafter referred to as the wound state). Generally, an earlier timing is selected from a period immediately after the inserted cartridge is detected and immediately before the drawing of the magnetic tape starts.

A spring hole 4a is made between the arm support pin and the follower roller 6, one end of a spring 7 is engaged and connected into the spring hole 4a, and the other end of the spring is engaged and connected to a certain point of the apparatus base 10, so that the follower roller 6 side of the arm 4 is pushed toward the loading cam wheel 8. The rotary brush 3 is disposed so that when the cleaning cam 8a thrusts up the follower roller 6, the tip end of the brush bristle abuts on the rotary head drum 1.

As shown in FIG. 1, the rotary brush 3 has a substantially cylindrical shape, and the rotation shaft direction is substantially parallel with a tangent line on the side face of the rotary head drum 1 in a point in which the rotary head drum 1 abuts on the rotary brush 3, and with the upper surface of the rotary head drum 1. A plurality of bristles of the rotary brush 3 radially extend on the line connecting the center of the rotary brush 3 and the outside, the bristles are arranged in the substantially normal direction of the rotary head drum in a portion where the rotary head drum 1 contacts the rotary brush 3, and the bristles of the rotary brush rub the rotary head drum in parallel with the rotation shaft of the rotary head drum.

The position of a micro switch 21 is set such that when the follower roller 6 is not pushed up by the cleaning cam 8a, the micro switch 21 fixed to the apparatus base 10 is apart from the arm 4, but that when the follower roller 6 is pushed up by the cleaning cam 8a, the micro switch 21 contacts the arm 4. Moreover, this micro switch 21 is connected to a power source via a wiring (not shown) and connected to the terminal of the motor 2 via a flat cable (not shown), so that when the micro switch 21 turns on/off, the motor 2 can be started/stopped.

FIG. 4 is a sectional view showing a position relation between the rotary head drum as an object for which the head cleaner of the present invention is used, and the magnetic head. Foreign matters are easily accumulated particularly in gaps A and B between the rotary head drum 1 and a magnetic head 1a.

The operation of the embodiment of the present invention will next be described. When the cartridge incorporating the magnetic tape is not inserted into the apparatus, the follower roller 6 is pushed by the spring 7 in the low position of the cleaning cam 8a of the loading cam wheel 8 (the position close to the center of the loading cam wheel 8). Therefore, the rotary brush 3 on the opposite side of the follower roller 6 with respect to the arm support pin 5 is apart from the rotary head drum 1. While the insertion of the cartridge is detected, the taking of the cartridge is completed, and the drawing operation of the magnetic tape is started, the follower roller 6 is pushed up by the cleaning cam 8a to move to a high position, that is, to move apart from the center of the cleaning cam 8a, and the arm 4 rotates counterclockwise.

Then the arm 4 abuts on the micro switch 21, the micro switch turns on, and the motor 2 starts rotating. The rotary brush 3 attached to the shaft of the motor 2 on the opposite side of the arm support pin 5 contacts the rotary head drum 1 while rotating.

When the follower roller 6 is pushed up and is in the high position, power is supplied to the motor 2, the rotary brush 3 rotates, and the rotary head drum 1 slowly rotates. Therefore, when the magnetic head 1a abuts on the rotary brush 3, the magnetic head 1a is cleaned. In this state, the loading cam wheel 8 operates so as to hold the positions of loading cam wheel 8, arm 4, motor 2, and rotary brush 3 (the rotational position of the rotary brush 3 is not taken into consideration) until a given time elapses. The given time is, for example, three seconds, but can appropriately be changed in consideration of the cleaning effect.

Since the rotary brush 3 is forced to rotate by the drive of the motor 2, the foreign matters can be removed more securely. In this case, the rotational speed of the rotary head drum 1 is set to be a value smaller than that of the usual read/write rotational speed, for example, 30 rpm. Moreover, the rotational speed of the motor 2 is, for example, in the range of 200 to 500 rpm.

The cleaning cam 8a falls, the follower roller 6 is returned to a low position (the position close to the center of the loading cam wheel 8) by the spring 7 and the rotary brush 3 leaves the rotary head drum. In this case, since the arm 4 leaves the micro switch 21 and the micro switch turns off, the rotation of the motor 2 stops. Thereafter, the magnetic tape is drawn from the cassette, and further the rotary head drum 1 is wound with the magnetic tape, thereby completing the load operation. When the magnetic tape is discharged, the loading cam wheel 8 rotates in reverse and is unwound, the magnetic tape is wound into the cartridge, then the follower roller again passes the high position of the cleaning cam 8a, and the magnetic head is cleaned. When the cartridge moves to an insertion discharge port, the follower roller 6 shifts to the low position of the cleaning cam 8a, and the rotary brush 3 is detached from the rotary head drum 1.

Particularly in the first embodiment of the present invention, the contact area of the rotary brush 3 and rotary head drum 1 is small, the scratching force of the rotary brush per unit area is large, and a strong cleaning effect can be realized.

Figure 2:
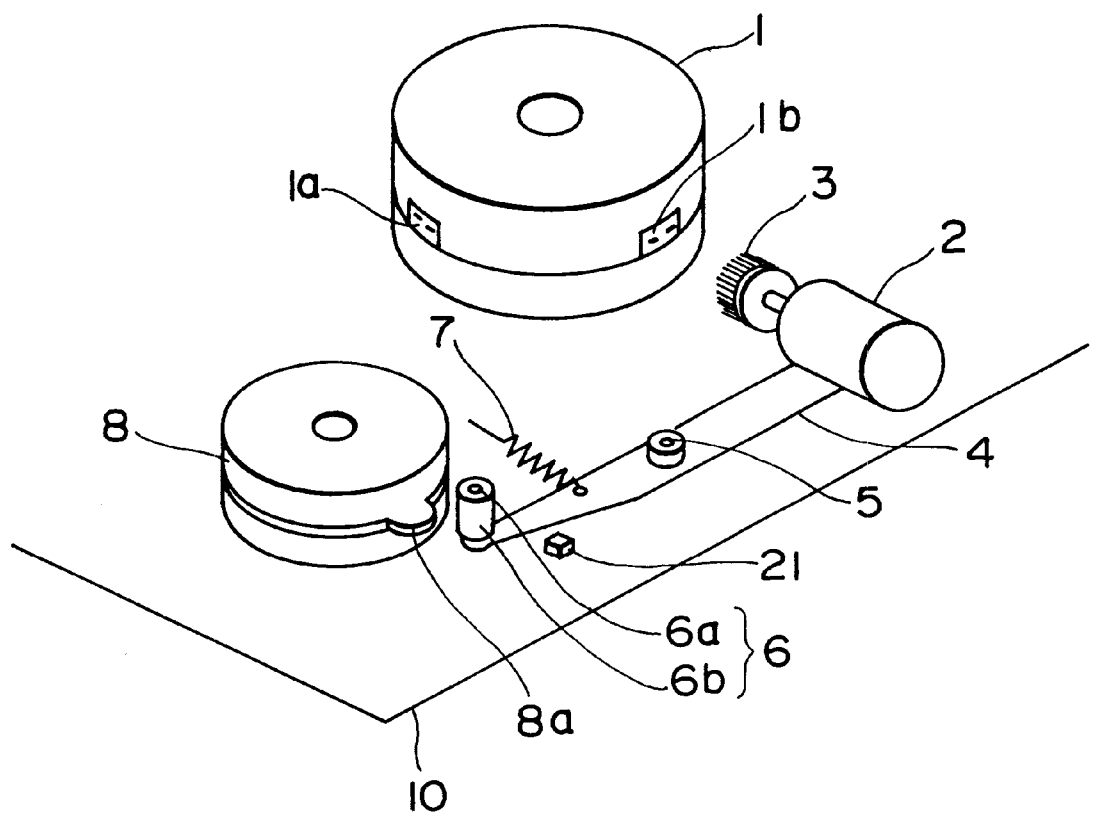
FIG. 2 is a perspective view showing the constitution of the rotary head drum and the head cleaner in a second embodiment of the present invention.
Figure 3:
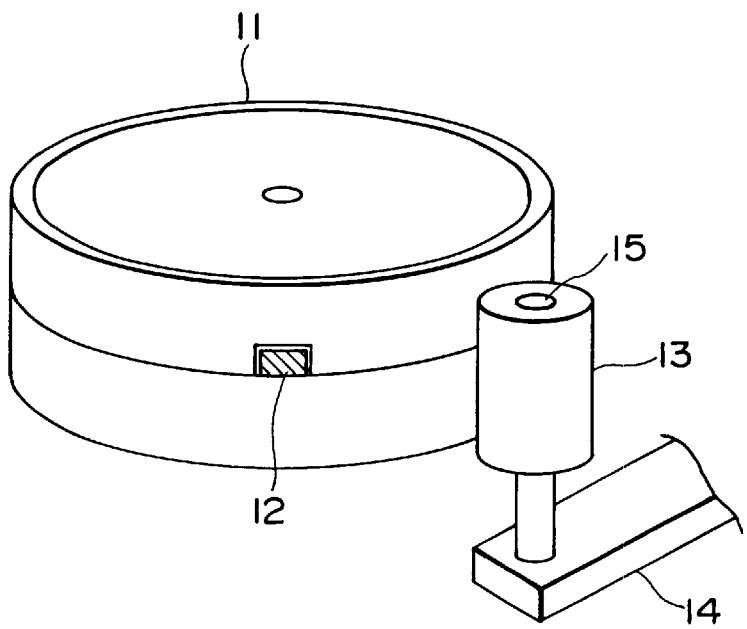
FIG. 3 is a perspective view showing the constitution of a conventional head cleaner.

FIG. 2 shows a second embodiment of the present invention. A cup type brush is employed as the cleaning member in the rotary brush 3, and the bristles constituting the brush are parallel with the rotation shaft of the rotary brush 3 and form a cylindrical shape. The brush is characterized in that the bristles are arranged to be perpendicular to the rotation shaft of the rotary head drum 1. For the rotary brush, the rotation shaft direction substantially agrees with the normal direction of the rotary head drum in the point in which the rotary head drum abuts on the rotary brush. The rotary brush has a substantially cylindrical shape, and the bristles of the rotary brush are extended in parallel with the normal direction of the rotary head drum.

The second embodiment is similar to the first embodiment except that the shape and attachment position of the rotary brush and the attachment position of the motor 2 are different.

The effect of the second embodiment is also substantially similar to the effect of the first embodiment of the present invention.

The second embodiment of the present invention has another effect that the wiped dust is held inside the rotary brush 3 and is not easily scattered to the periphery.

The second embodiment of the present invention has further effect that the dust is scratched not in a constant direction but in various directions, and the dust can effectively be removed, even when the adhesive force of the dust has a dependence on direction.

A first effect is that the dust having the adhesive property can be removed.

This is because the rotary brush 3, driven by the motor or the like to rotate, rubs and cleans the surfaces of the rotary head drum 1 and magnetic head 1a, and can therefore scrape off even the foreign matters which have adhesive properties and adhere to the surfaces.

As a second effect, only the cleaning members such as sponge and non-woven fabric that have relatively smoothly continuous shapes can be employed in the prior art, but in the present invention, even the cleaning members such as a brush whose bristles are arranged in a scattered manner can be used.

The reason is that the cleaning member rotates itself in the present invention. On the other hand, in the prior art, the cleaning member is driven by the rotation of the rotary head drum to rotate. If the surface shape of the member is a discontinuous shape in which the bristles are arranged in the scattered manner, the rotating force is not well transmitted to the cleaning member.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A head cleaner for contacting/rotating a sliding surface of a rotary head drum for use in a magnetic tape read/write apparatus to perform cleaning, comprising:

a motor for operating by an external power independently of rotation of the rotary head drum;

a cleaning member for being forcibly driven by said motor to rotate; and a rotary cleaning member moving means for pressing or detaching said cleaning member to or from said rotary head drum, wherein said cleaning member comprises a rotary brush including a plurality of bristles, said rotary brush has a cylindrical shape, a rotation shaft direction of said rotary brush is substantially perpendicular to a rotation shaft direction of the rotary head drum, said rotary head drum having a cylindrical shape, the bristles of said rotary brush are extended in a radial manner from the rotation shaft, and said bristles of the rotary brush rub the rotary head drum in a direction parallel with the rotation shaft of said rotary head drum to perform a cleaning operation.

2. The head cleaner according to claim 1, wherein said rotary cleaning member moving means comprises:

an arm having one end for supporting said motor, and a middle portion rotatably supported on an apparatus base by an arm support pin, a spring having one end connected to the other end side of said arm, and the other end connected to the apparatus base, and a follower roller on the other end of said arm, said follower roller is in a position relation in said magnetic tape read/write apparatus in which when a loading cam wheel for rotating with the load/unload operation of a magnetic tape is rotated and a cam on the side face of said loading cam wheel pushes up said follower roller, said follower roller moves apart from the center of said loading cam wheel.

3. The head cleaner according to claim 2, wherein said follower roller comprises:

a shaft fixed to the other end of said arm, and a roller rotatably supported on the shaft.

4. The head cleaner according to claim 3, further comprising a micro switch positioned on the opposite side of said loading cam wheel as seen from the other end side of said arm, and positioned to contact said arm only when said follower roller is pushed up by said cam, wherein when said micro switch contacts said arm, said micro switch turns on and said motor rotates, and when the micro switch is detached from said arm, said micro switch turns off and the rotation of said motor stops.

5. The head cleaner according to claim 2, further comprising a micro switch positioned on the opposite side of said loading cam wheel as seen from the other end side of said arm, and positioned to contact said arm only when said follower roller is pushed up by said cam, wherein when said micro switch contacts said arm, said micro switch turns on and said motor rotates, and when the micro switch is detached from said arm, said micro switch turns off and the rotation of said motor stops.

6. A head cleaner for contacting/rotating a sliding surface of a rotary head drum for use in a magnetic tape read/write apparatus to perform cleaning, comprising:

a motor for operating by an external power independently of rotation of the rotary head drum;

a cleaning member for being forcibly driven by said motor to rotate; and a rotary cleaning member moving means for pressing or detaching said cleaning member to or from said rotary head drum, wherein said cleaning member comprises a rotary brush including a plurality of bristles, said rotary brush has a cylindrical shape, a rotation shaft direction of said rotary brush is substantially perpendicular to a rotation shaft direction of the rotary head drum and substantially perpendicular to a side face of said rotary head drum in a point in which said rotary head abuts said rotary brush, said rotary head drum having a cylindrical shape, the bristles of said rotary brush are extended in parallel with said rotation shaft of the rotary brush, and said bristles of the rotary brush rub said rotary head drum to perform a cleaning operation.

7. The head cleaner according to claim 6, wherein said rotary cleaning member moving means comprises:

an arm having one end for supporting said motor, and a middle portion rotatably supported on an apparatus base by an arm support pin, a spring having one end connected to the other end side of said arm, and the other end connected to the apparatus base, and a follower roller on the other end of said arm, said follower roller is in a position relation in said magnetic tape read/write apparatus in which when a loading cam wheel for rotating with the load/unload operation of a magnetic tape is rotated and a cam on the side face of said loading cam wheel pushes up said follower roller, said follower roller moves apart from the center of said loading cam wheel.

8. The head cleaner according to claim 7, wherein said follower roller comprises:

a shaft fixed to the other end of said arm, and a roller rotatably supported on the shaft.

9. The head cleaner according to claim 8, further comprising a micro switch positioned on the opposite side of said loading cam wheel as seen from the other end side of said arm, and positioned to contact said arm only when said follower roller is pushed up by said cam, wherein when said micro switch contacts said arm, said micro switch turns on and said motor rotates, and when the micro switch is detached from said arm, said micro switch turns off and the rotation of said motor stops.

10. The head cleaner according to claim 7, further comprising a micro switch positioned on the opposite side of said loading cam wheel as seen from the other end side of said arm, and positioned to contact said arm only when said follower roller is pushed up by said cam, wherein when said micro switch contacts said arm, said micro switch turns on and said motor rotates, and when the micro switch is detached from said arm, said micro switch turns off and the rotation of said motor stops.

* * * * *